United States Patent [19]

Uchida et al.

[11] Patent Number: 5,707,098

[45] Date of Patent: Jan. 13, 1998

[54] DOOR STRUCTURE FOR VEHICLE

[75] Inventors: Katsuyoshi Uchida; Eiji Murakami, both of Sagamihara, Japan

[73] Assignee: Nissan Motor Co., Ltd., Yokohama, Japan

[21] Appl. No.: 525,004

[22] Filed: Sep. 8, 1995

Related U.S. Application Data

[62] Division of Ser. No. 260,816, Jun. 16, 1994, Pat. No. 5,466,031.

[30] Foreign Application Priority Data

Jun. 24, 1993 [JP] Japan ................................ 5-153582

[51] Int. Cl.$^6$ ................................................. B60R 21/04
[52] U.S. Cl. ................................. 296/196.6; 296/189
[58] Field of Search ............................ 296/146.6, 188, 296/189

[56] References Cited

U.S. PATENT DOCUMENTS

| | | | |
|---|---|---|---|
| 3,964,208 | 6/1976 | Renner et al. | 296/146.6 X |
| 5,040,335 | 8/1991 | Grimes | 296/189 X |
| 5,102,163 | 4/1992 | Ishikawa | 296/188 X |
| 5,141,279 | 8/1992 | Weller | 296/189 X |
| 5,171,058 | 12/1992 | Ishikawa | 296/189 |
| 5,306,066 | 4/1994 | Saathoff | 296/146.6 |

FOREIGN PATENT DOCUMENTS

| | | |
|---|---|---|
| 61-171620 | 10/1986 | Japan. |
| 1-144112 | 10/1989 | Japan. |
| 2-64422 | 5/1990 | Japan. |
| 3-16514 | 2/1991 | Japan. |
| 3-121923 | 5/1991 | Japan. |

*Primary Examiner*—Joseph D. Pape
*Attorney, Agent, or Firm*—Foley & Lardner

[57] ABSTRACT

A door structure for a vehicle capable of increasing its capability of protecting a passenger on the vehicle without increasing the thickness of the pad. The door structure is provided with a door body including an inner panel and an outer panel, reinforcements secured to each of the panels and a pad attached to the inner panel to protect the passenger. In the longitudinal direction of the vehicle, each of the reinforcements has its rear end positioned in front of the passenger. Because each panel has a higher rigid part with the reinforcement and a lower rigid part without the reinforcements, when an external force is exerted on the door body, it begins to deform in the vicinity of the rear end of the reinforcement, whereby it is possible to absorb the energy of the external force efficiently without injuring the passenger.

5 Claims, 5 Drawing Sheets

DOOR STRUCTURE FOR VEHICLE

This application is a divisional of application Ser. No. 08/260,816 filed Jun. 16, 1994 U.S. Pat. No. 5,466,031.

BACKGROUND OF THE INVENTION

This invention relates to a door structure for a vehicle.

In Japanese Unexamined Utility Model Publication No. 61-171620, there is disclosed a conventional door structure comprising a door body including an inner panel arranged on the interior side of the vehicle and an outer panel arranged on the outside of the inner panel. In the door structure, a waist opening through which a window panel rises and falls, is formed between the inner panel and the outer panel and formed in an upper part of the door body. In the door body, an inner reinforcement and an outer reinforcement are secured to the inner panel and the outer panel, respectively, to ensure the rigidity of the waist opening. Each of the reinforcements has an uneven cross section continuously extending along the longitudinal direction of the vehicle. Therefore, each of the reinforcements exhibits substantially constant rigidity from its front end, through its rear end, along the longitudinal direction.

In addition, the door construction comprises a pad, which is made of foamy synthetic material, and which is arranged in a position corresponding to a passenger's position in the side view of the door body. This pad serves to absorb a shock applied on the passenger when external force is exerted on the door body by a traffic accident, etc., so that it is deformed to the interior side of the vehicle.

In the conventional door structure as mentioned above, since the passenger is protected by the pad arranged in the position corresponding to the passenger's position, the thickness of the pad must be increased in order to progress the capability of protecting the passenger from the door body deformed. However, the more the thickness of the pad is increased to increase the protecting capability, the more the interior volume of the vehicle is decreased. Therefore, in the conventional door structure, there remains the limitation of increasing the thickness of the pad.

SUMMARY OF THE INVENTION

It is an object of the present invention to provide an door structure for a vehicle capable that increases the protection of a passenger in the vehicle, without increasing the thickness of the pad.

The objects of the invention described above can be accomplished by a door structure for a vehicle, comprising:
 a door body including an inner panel arranged on the interior side of the vehicle and an outer panel arranged on the outside of the inner panel, the door body having a waist opening in an upper part thereof, through which a window panel rises and falls, the waist opening being defined by the inner panel and the outer panel;
 an inner reinforcement secured on the inner panel in the door body extends along the waist opening;
 an outer reinforcement secured on the outer panel in the door body extends along the waist opening;
 a pad secured on the inner panel and arranged in a position corresponding to a passenger's position; and
wherein the inner reinforcement or the outer reinforcement is provided in the door body so that the door body deforms at a position in front of the passenger.

In the present invention, the inner reinforcement or the outer reinforcement is provided with changeable means for deforming the door body at a position in front of the passenger's position, even if external force is exerted on the door body. Thus, the door body is easily subjected to deformation in its part in front of the passenger's position. Consequently, due to such deformation of this part of the door body, it is possible to absorb the energy derived from the external force efficiently, whereby it enables to decrease a shock which is exerted to the passenger though the intermediary of the pad.

In the present invention, preferably, the changeable means comprise the inner reinforcement or the outer reinforcement having its rear end positioned in front of the passenger's position.

The changeable means may comprise a part of the inner reinforcement or the outer reinforcement, the part being arranged in front of the passenger's position to have a cross section different from the other part of the inner reinforcement or the outer reinforcement.

Again, the changeable means may comprise a reinforcing member secured to the inner reinforcement or the outer reinforcement, the reinforcing member being arranged in front of the passenger's position.

Further, the changeable means may comprise a notch formed in the inner reinforcement or the outer reinforcement, the notch being arranged in front of the passenger's position.

DESCRIPTION OF THE PREFERRED EMBODIMENT

Figure 1:
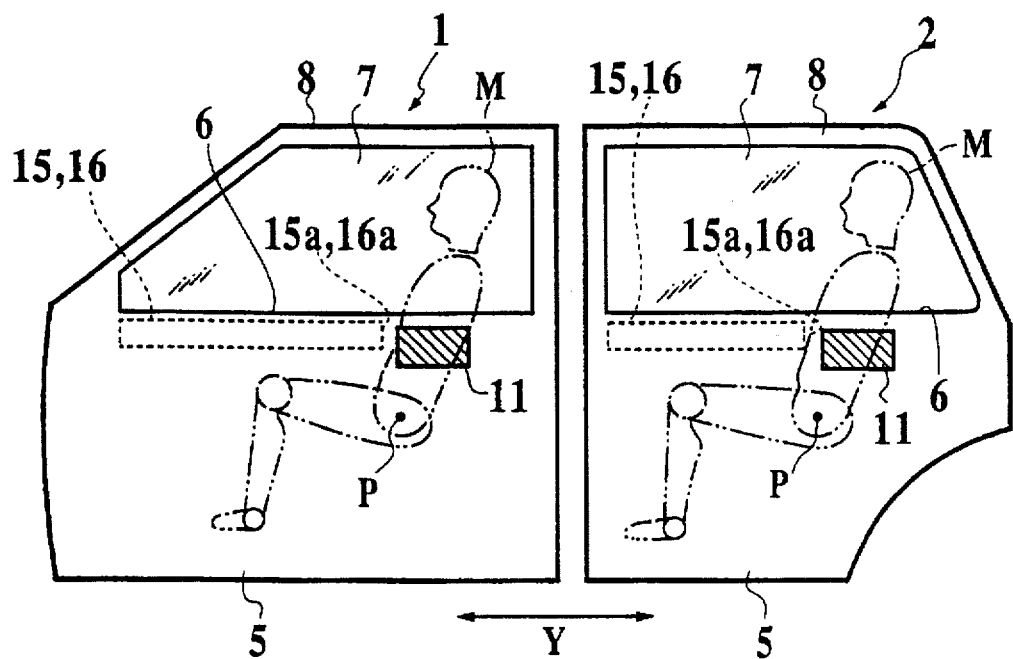
FIG. 1 is a side view showing a door structure for vehicle according to a first embodiment of the present invention.

FIGS. 1 to 4 show a first embodiment according to the present invention. Referring to FIG. 1, reference numeral 1 designates a front door and reference numeral 2 denotes a rear door, both of which constitute the door structure of the invention. As well as the rear door 2, the front door 1 includes an inner panel 3 and an outer panel 4 shown in FIG. 2, both of which constitute a door body 5. Provided in the upper part of the door body 5 is a waist opening 6, which extends from the front side of the door body 5 to the rear side. The waist opening 6 extends thereof along a longitudinal direction of the vehicle, which is shown by an arrow "Y". Further, in the upper part of the door body 5, there is provided a sash 8, which sealingly supports an upper part of a window panel 7 when raised through the waist opening 6.

Figure 2:
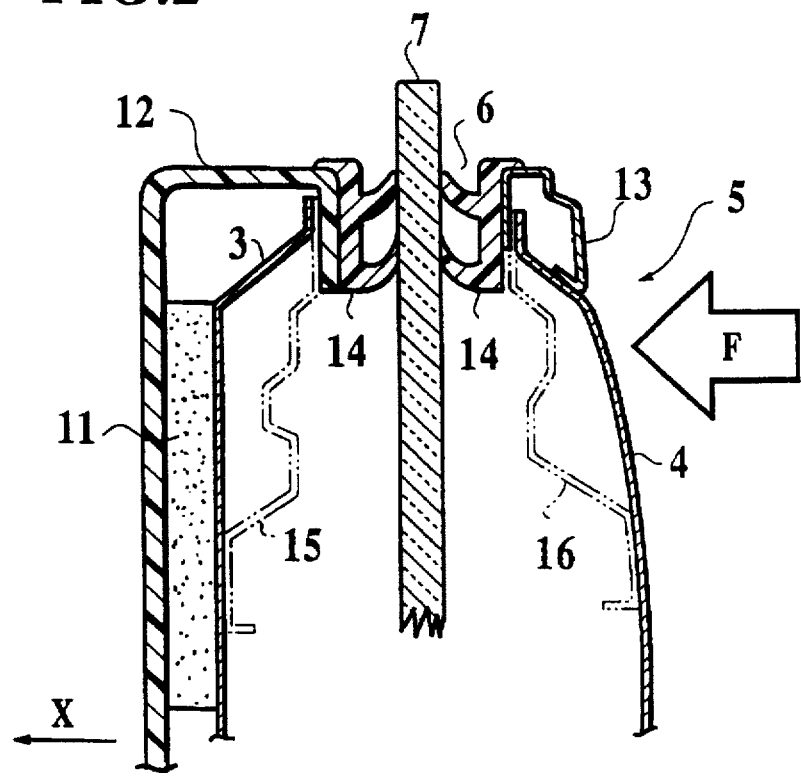
FIG. 2 is a longitudinal sectional view of the door structure according to the first embodiment shown in FIG. 1.

Inside each of the inner panel 3 and the outer panel 4, an inner reinforcement 15 and an outer reinforcement 16 are secured to the inner panel 3 and the outer panel 4, respectively, to ensure the rigidity of the waist opening 6. As shown in FIG. 1, each of the reinforcements 15 and 16 extends along the direction "Y", and has an uneven cross section as shown in FIG. 2.

A pad 11, which is made of foamy synthetic material, is attached on an outer surface of the inner panel 3, which faces a passenger M. The pad 11 serves as a shock absorber to protect the passenger M when an external force F is exerted on the door body 5. The external force F causes the door body 5 to be deformed to the interior side "X" of the vehicle. The pad 11 is covered with a trim 12 which is arranged in the interior side X of the vehicle. On an opposite side of the trim 12, a mold 13 is secured to the upper part of the outer panel 4. Provided between the trim 12 and the mold 13 are weather strips 14 which sealingly support the window panel 7 from both sides, thereof, in the waist opening 6.

In the door construction mentioned above, according to the first embodiment of the invention, both of the reinforcements 15 and 16 are formed shorter than conventional reinforcements. That is, in the longitudinal direction Y of the vehicle, the rear ends 15a and 16a of the reinforcements 15 and 16 are respectively positioned in front of a hip-point "P" of each passenger M, in other words, a "passenger's position". Therefore, the door body 5 of the embodiment is provided with a front part of higher rigidity, which is reinforced by the reinforcements 15 and 16, and a rear part of lower rigidity, which is not reinforced by the reinforcements 15 and 16 to extend behind the rear ends 15a and 16a, thereof.

Figure 3:
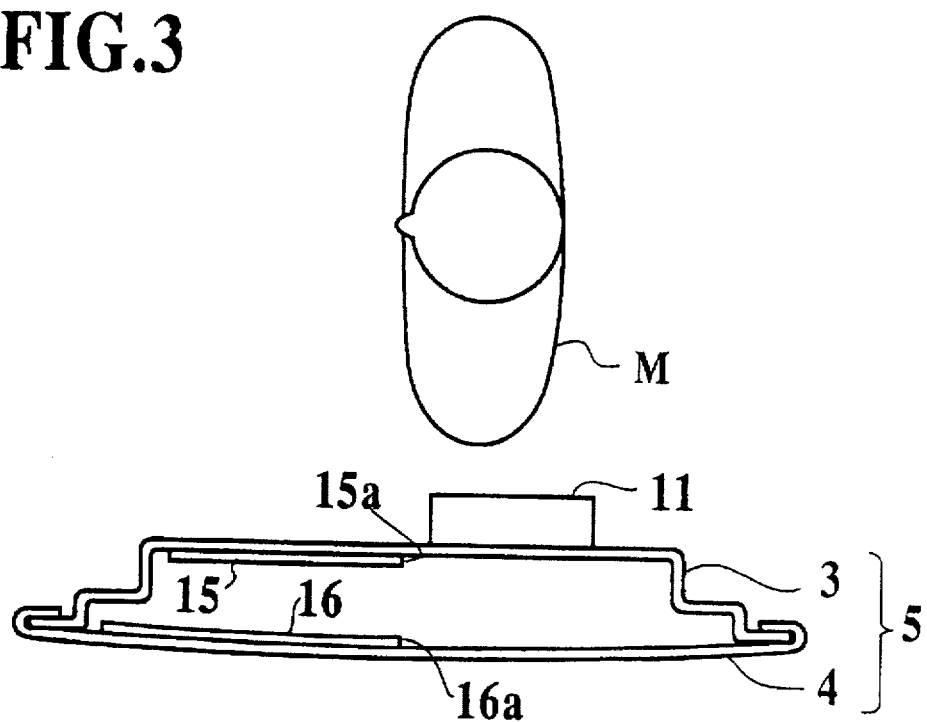
FIG. 3 is a transverse sectional view of the door structure according to the first embodiment.
Figure 4:
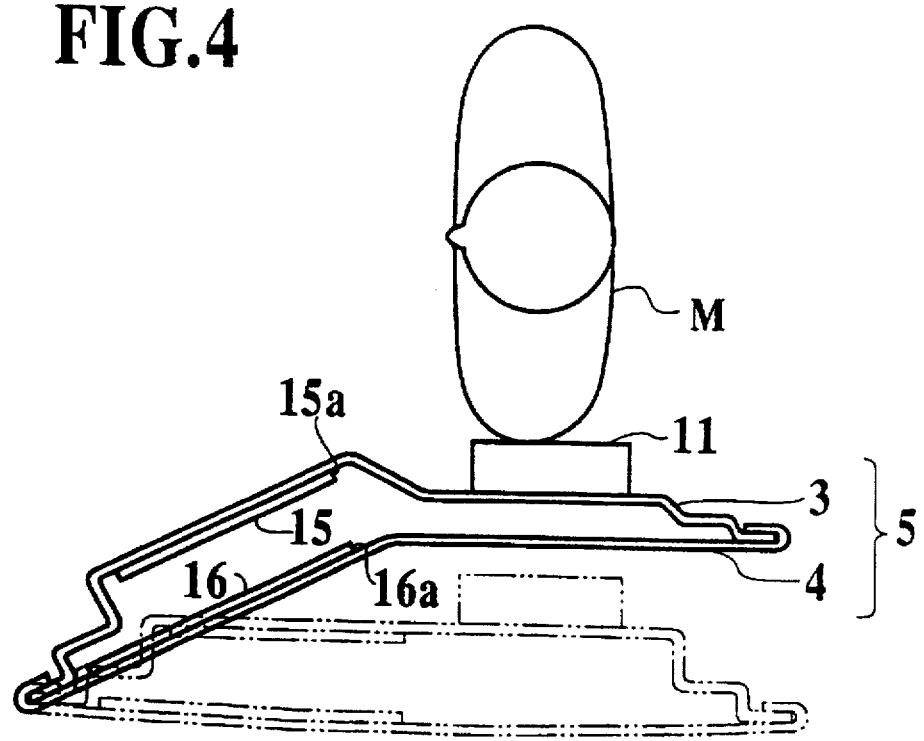
FIG. 4 is a transverse sectional view of the door structure of FIG. 3 in condition that external force is exerted thereon.

Referring to FIGS. 3 and 4, when the external force F is exerted on the present door body 5, it is deformed and bent in the vicinity of the rear ends 15a and 16a, since they are parts in which the rigidity is abruptly changed. Consequently, with the deformation of the parts, it is possible to absorb the energy derived from the external force F efficiently, whereby it enables to decrease a shock which is exerted to the passenger M through the intermediary of the pad 11.

On the contrary, in the conventional structure, since the conventional door body has been constructed so as to have constant rigidity from its front end to its rear end throughout, the door body is not always subjected to deformation at a regular point when the external force F is exerted thereon.

According to the embodiment of the invention, since the door body 5 is provided with such changeable parts in rigidity about the rear ends 15a and 16a of the reinforcements 15 and 16, the door body 5 easily deforms from the parts in the vicinity of the ends 15a and 16a effecting the respective triggers for the whole deformation. Furthermore, since each of the rear ends 15a and 16a, where the deformation starts, is positioned in front of the hip-point P of the passenger M, there is no possibility of contacting ends 15a and 16a, deformed to the interior side X, with the passengers M. As mentioned above, according to the first embodiment of the invention, it is possible to increase the capability of protecting the passengers M in the vehicle without increasing the thickness of the pad 11.

Figure 5:
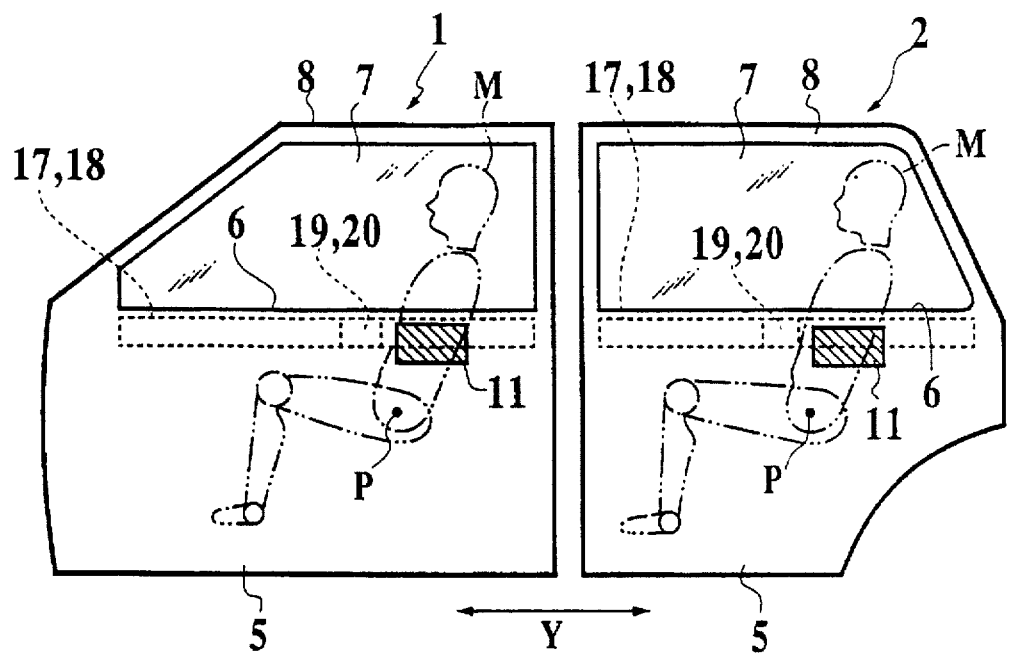
FIG. 5 is a side view showing a door structure for vehicle according to a second embodiment of the present invention.
Figure 6:
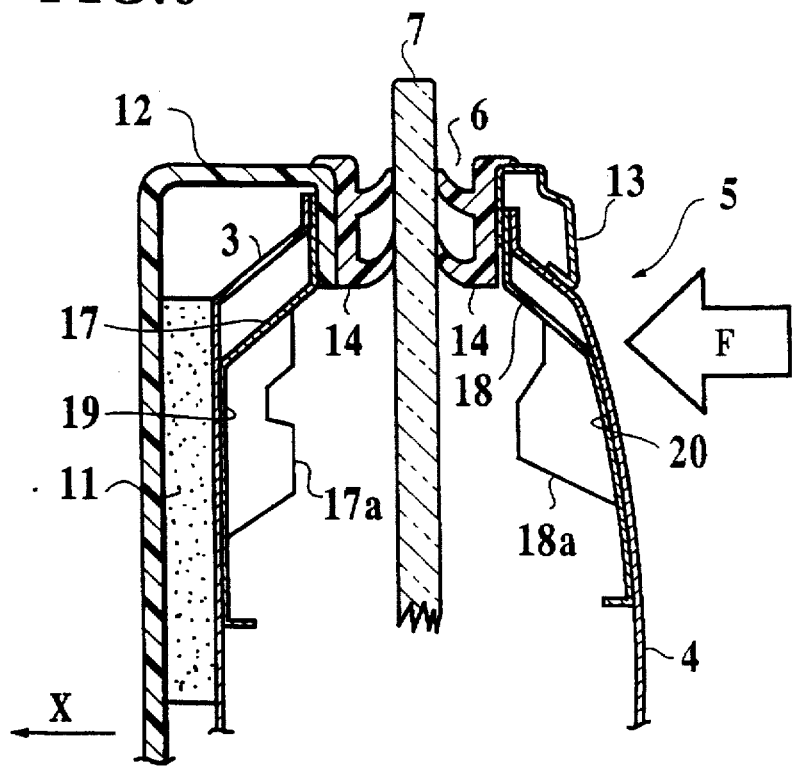
FIG. 6 is a longitudinal sectional view of the door structure according to the second embodiment shown in FIG. 5.

FIGS. 5 and 6 show a second embodiment of the invention. Note that, in several embodiments which will be mentioned hereinafter, the elements identical to those of the first embodiment are indicated by the same reference numerals.

According to the second embodiment of the invention, both of reinforcements 17 and 18 are provided with reduced rigidity portions 19 and 20 having a relatively weak cross section, each of which is arranged in front of the hip-point P of the passenger M, corresponding to the above-mentioned changeable parts in rigidity. That is, according to the embodiment, while the other parts 17a and 18a of the reinforcements 17 and 18 are formed so as to have a corrugated cross section in order to increase the rigidity, the reduced rigidity portions 19 and 20 are formed so as to have generally planar cross sections in parallel with the inner panel 3 and the outer panel 4, respectively. Thus, the reinforcements 17 and 18 are provided with the reduced rigidity portions 19 and 20 of lower rigidity in comparison with the other parts of the reinforcements 17 and 18, respectively. Consequently, when the external force F is exerted on the door body 5, it begins to deform to the interior side X, with the reduced rigidity portions 19 and 20 as starting points of deformation, and then it is possible to absorb the energy derived from the external force F without injuring the passengers M.

Figure 7:
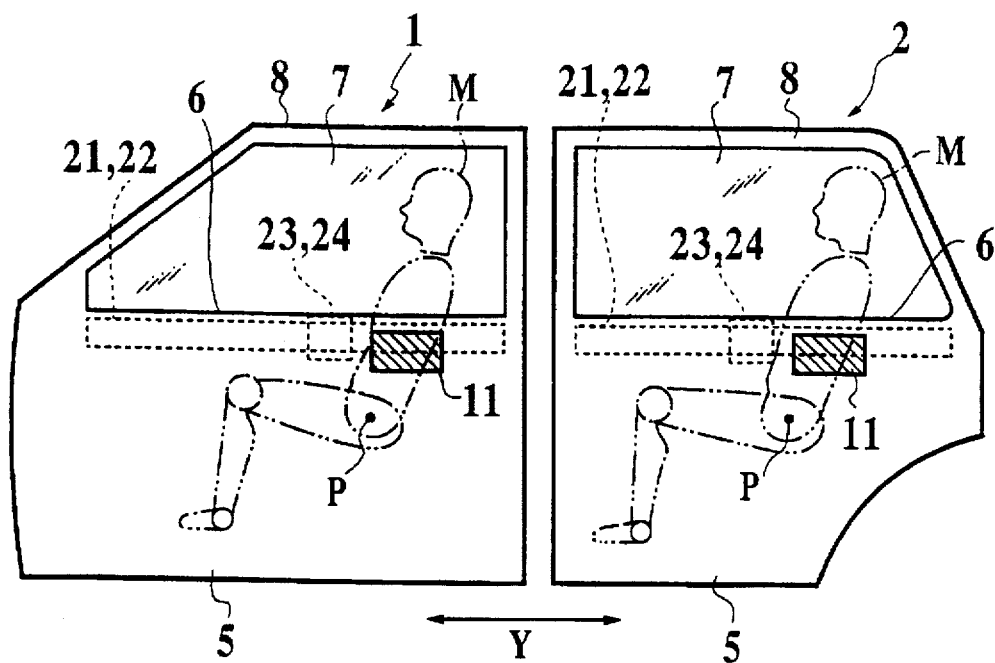
FIG. 7 is a side view showing a door structure for vehicle according to a third embodiment of the present invention.
Figure 8:
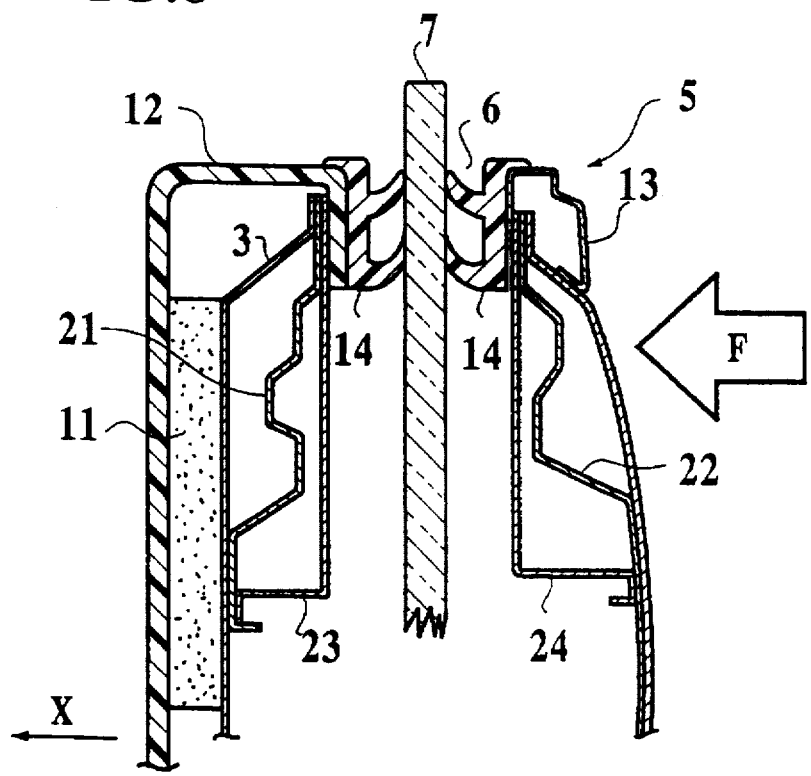
FIG. 8 is a longitudinal sectional view of the door structure according to the third embodiment shown in FIG. 7.

FIGS. 7 and 8 show a third embodiment of the invention. According to this third embodiment of the invention, additional reinforcing members 23 and 24 are secured to parts of the reinforcements 21 and 22. As shown in FIG. 7, the members 23 and 24 are arranged in front of the hip-point P of the passenger M, respectively. With the respective parts of the reinforcements 21 and 22, each of the reinforcing members 23 and 24 produces a closed space defined in the door body 5. Therefore, in the reinforcements 21 and 22, the rigidity of the parts provided with the reinforcing members 23 and 24 is higher than that of the other parts, whereby the front ends and the rear ends of the members 23 and 24 can provide the above-mentioned "changeable parts in rigidity". Consequently, when the external force F is exerted on the door body 5, it begins to deform to the interior side X with both ends of each of the members 23 and 24, and then it is possible to absorb the energy derived from the external force F without injuring the passengers M.

Figure 9:
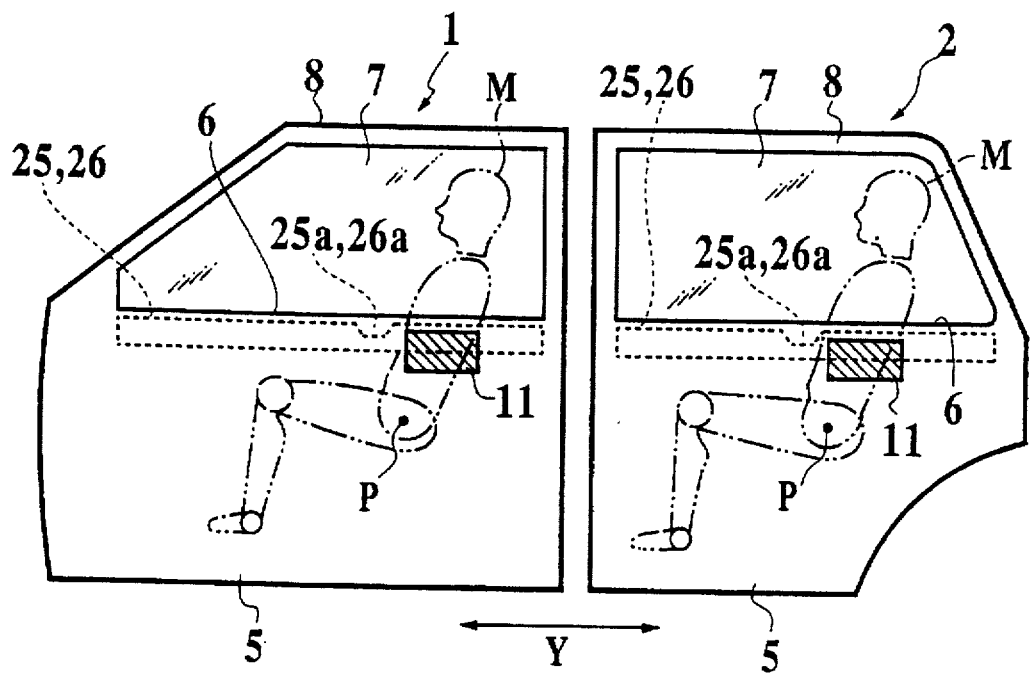
FIG. 9 is a side view showing a door structure for vehicle according to a fourth embodiment of the present invention.
Figure 10:
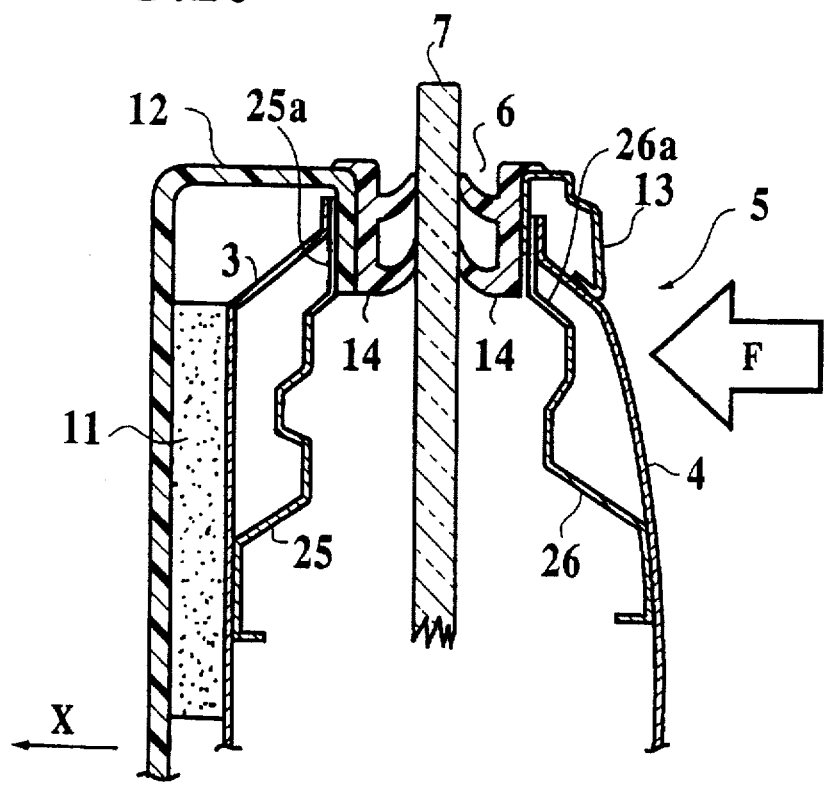
FIG. 10 is a longitudinal sectional view of the door structure according to the fourth embodiment shown in FIG. 9.

FIGS. 9 and 10 show a fourth embodiment of the invention. According to the embodiment, both of reinforcements 25 and 26 are partially cut off to define notches 25a and 26a in front of the hip-point P of the passenger M, respectively. Thus, in the reinforcements 25 and 26 of the embodiment, the parts about the notches 25a and 26a, which corresponds to the above-mentioned "changeable parts in rigidity", have a low rigidity in comparison with that of the other parts of the reinforcements 25 and 26. Consequently, even if the external force F is exerted on the door body 5, it begins to deform to the interior side X with the parts about the notches 25a and 26a, and then it is possible to absorb the energy derived from the external force F without injuring the passengers M.

Although the "changeable parts in rigidity" are provided with both of the inner reinforcement and the outer reinforcement through the above-mentioned embodiments, it should be understood by those skilled in the art that the "changeable part in rigidity" can be applied to any one of the inner reinforcement and the outer reinforcement. In addition, the "changeable part in rigidity" of the reinforcement may be provided by a combination of forms disclosed in the above embodiments.

Finally, it will be understood by those skilled in the art that the foregoing description of the preferred embodiments of the disclosed door structure, and that various changes and modifications may be made to the present invention without departing from the spirit and scope thereof.

What is claimed is:

1. A door structure for protecting a passenger in a vehicle, comprising:
   a door body including an inner panel arranged on the interior side of said vehicle and an outer panel arranged on the outside of said inner panel, said door body having a waist opening in an upper part thereof, through which a window panel rises and falls, said waist opening being defined by said inner panel and said outer panel;
   an inner reinforcement secured on said inner panel in said door body to extend along said waist opening;
   an outer reinforcement secured on said outer panel in said door body to extend along said waist opening;
   wherein at least one of said inner reinforcement and said outer reinforcement is provided with a reduced rigidity portion entirely located forward of the passenger's hip point;
   whereby said door body can be easily deformed forward of the passenger's hip point.

2. A door structure for a vehicle as claimed in claim 1, wherein said reduced rigidity portion has a cross section configuration different from other portions of said at least one of said inner reinforcement and said outer reinforcement.

3. A door structure for a vehicle as claimed in claim 2, further comprising a pad secured on said inner panel and located at a longitudinal position corresponding to the passenger's hip point.

4. A door structure for a vehicle as claimed in claim 1, wherein said reduced rigidity portion comprises a weak portion formed in at least one of said inner and said outer reinforcement, said weak portion being arranged forward of the passenger's hip point.

5. A door structure for a vehicle as claimed in claim 1, wherein said reduced rigidity portion comprises a notch formed in said inner reinforcement or said outer reinforcement, said notch being arranged in front of the passenger's hip point.

* * * * *